United States Patent
Eom et al.

(10) Patent No.: US 9,184,653 B2
(45) Date of Patent: Nov. 10, 2015

(54) SHORT SENSING CIRCUIT, SHORT SENSING METHOD AND POWER SUPPLY DEVICE COMPRISING THE SHORT SENSING CIRCUIT

(71) Applicant: FAIRCHILD KOREA SEMICONDUCTOR LTD., Bucheon (KR)

(72) Inventors: Hyun-Chul Eom, Seoul (KR); In-Ki Park, Anyang-si (KR)

(73) Assignee: Fairchild Korea Semiconductor LTD (KR)

( * ) Notice: Subject to any disclaimer, the term of this patent is extended or adjusted under 35 U.S.C. 154(b) by 70 days.

(21) Appl. No.: 13/921,474

(22) Filed: Jun. 19, 2013

(65) Prior Publication Data

US 2013/0342938 A1  Dec. 26, 2013

Related U.S. Application Data

(60) Provisional application No. 61/661,946, filed on Jun. 20, 2012.

(30) Foreign Application Priority Data

May 23, 2013  (KR) .................. 10-2013-0058580

(51) Int. Cl.
*H02H 9/08* (2006.01)
*H02M 1/32* (2007.01)
*H02H 9/02* (2006.01)
*H02M 3/335* (2006.01)
*H02H 3/08* (2006.01)
*H02M 1/42* (2007.01)

(52) U.S. Cl.
CPC . *H02M 1/32* (2013.01); *H02H 3/08* (2013.01); *H02H 9/02* (2013.01); *H02H 9/025* (2013.01); *H02M 1/4258* (2013.01); *H02M 3/33507* (2013.01); *H02M 3/33515* (2013.01); *Y02B 70/126* (2013.01)

(58) Field of Classification Search
USPC ...................................... 361/18, 93.7–93.9
See application file for complete search history.

(56) References Cited

U.S. PATENT DOCUMENTS

| | | | | |
|---|---|---|---|---|
| 5,596,465 A * | 1/1997 | Honda et al. | ..................... | 361/18 |
| 6,002,215 A * | 12/1999 | Yamashita et al. | ............ | 315/308 |
| 2008/0247199 A1* | 10/2008 | Djenguerian et al. | .......... | 363/50 |
| 2011/0007435 A1* | 1/2011 | Dong et al. | ..................... | 361/18 |

* cited by examiner

*Primary Examiner* — Danny Nguyen
(74) *Attorney, Agent, or Firm* — Grossman Tucker Perreault & Pfleger PLLC

(57) ABSTRACT

A short-circuit sense circuit and a power supply according to an exemplary embodiment of the present invention use an auxiliary voltage, which is a both-end voltage of an auxiliary coil coupled with a predetermined turn ratio to a secondary side coil coupled to an output voltage. After termination of a start-up period, the short-circuit sense circuit samples a sense voltage, which is a voltage of a node between a first sense resistor and a second sense resistor coupled in series to both ends of the auxiliary coils and determines whether a short-circuit occurs according to a short-circuit sense signal that depends on a result of comparison between the sampled voltage and a predetermined reference voltage.

19 Claims, 7 Drawing Sheets

US 9,184,653 B2

SHORT SENSING CIRCUIT, SHORT SENSING METHOD AND POWER SUPPLY DEVICE COMPRISING THE SHORT SENSING CIRCUIT

CROSS-REFERENCE TO RELATED APPLICATION

This application claims priority to and the benefit of U.S. Patent Application No. 61/661,946 filed in the USPTO on Jun. 20, 2012, and priority to and the benefit of Korean Patent Application No. 10-2013-0058580, filed with the Korean Intellectual Property Office on May 23, 2013, the entire contents of which are incorporated herein by reference.

BACKGROUND OF THE INVENTION (a) Field of the Invention

The present invention relates to a short-circuit sense circuit, a short-circuit sensing method, and a power supply including the short-circuit sense circuit.

(b) Description of the Related Art

A load is coupled to an output terminal of a power supply, and a short circuit may occur in the load. When the load is short-circuited, a short-circuit protection operation of the power supply is triggered to prevent the power supply from malfunctioning.

For example, when an LED string coupled to the output terminal of the power supply as a load is short-circuited, the power supply should sense the short-circuit of the LED string and trigger a protection operation. In detail, the power supply can stop power supply by stopping a switching operation.

In order to trigger such a short-circuit protection operation, a circuit-circuit of the load should be sensed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a short-circuit sense circuit, a sort-circuit sensing method, and a power supply including the short-circuit sense circuit through exemplary embodiments.

A short-circuit sense circuit according to an exemplary embodiment of the present invention samples a sense voltage that depends on an output voltage, compares a voltage generated by sampling the sense voltage with a predetermined voltage, and determines whether a short-circuit occurs based on a result of counting the comparison result. The short-circuit sense circuit generates a gate shut-down signal based on whether the short-circuit occurs after termination of a start-up period.

The short-circuit sense circuit according to the exemplary embodiment of the present invention senses occurrence of a short-circuit in a load coupled to the power supply. The short-circuit sense circuit includes: an output voltage sensing unit sampling a sense voltage that depends on an output voltage of the power supply and generating a short-circuit sense signal according to a result of comparison between the sampled voltage and a predetermined reference voltage; a start-up counter counting a start-up period; and a gate shut-down unit generating a gate shut-down signal according to the short-circuit sense signal after termination of the start-up period according to an output of the start-up counter.

The sense voltage is a voltage divided from an auxiliary voltage, that is, a voltage of an auxiliary coil coupled with a predetermined turn ratio to a secondary side coil coupled to the output voltage, by a first sense resistor and a second sense resistor.

The output voltage sense unit includes a sample/hold unit generating a sampling voltage by sampling the sense voltage for a predetermined sampling cycle unit and holding the sampling voltage and a comparator generating the short-circuit sense signal according to a result of comparison between the sampling voltage and a predetermined reference voltage.

The start-up counter generating an enable-level start-up signal at a time after the start-up period is passed from an operation start time of the power supply.

The gate shut-down unit generates the gate shut-down signal by using the start-up signal and the short-circuit sense signal.

The gate shut-down unit includes an inverter to which the start-up signal is input and a logic gate generating the gate shut-down signal by performing a logic operation on an output of the inverter and the short-circuit sense signal.

A short-circuit sensing method for sensing a short-circuit in a load coupled to a power supply according to an exemplary embodiment of the present invention includes: generating a sampling voltage by sampling a sense voltage that depends on an output voltage of the power supply; generating a short-circuit sense signal according to a result of comparison between the sampling voltage and a predetermined reference voltage; and generating a gate shut-down signal according to the short-circuit sense signal after termination of the start-up period. A switching operation of the power supply is stopped according to an enable-level gate shut-down signal.

The sense voltage is a voltage divided from an auxiliary voltage, that is, a voltage of an auxiliary coil coupled with a predetermined turn ratio to a secondary side coil coupled to the output voltage, by a first sense resistor and a second sense resistor.

The generating the sampling voltage includes generating a sampling voltage by sampling the sense voltage for a predetermined sampling cycle unit and holding the sampling voltage.

A power supply according to an exemplary embodiment of the present invention includes: a primary side coil having a first terminal coupled to an input voltage; a power switch coupled to a second terminal of the primary side coil; a secondary side coil coupled to an output voltage; an auxiliary coil coupled with a predetermined turn ratio to the secondary side coil; a first sense resistor and a second sense resistor coupled in series to lateral terminals of the auxiliary coil; and a short-circuit sense circuit determining whether a short-circuit occurs using a short-circuit sense signal that depends on a result of a comparison between a voltage generated by sampling a sense voltage, which is a voltage of a node between the first sense resistor and the second sense resistor, with a predetermined reference voltage.

The short-circuit sense circuit includes a sample/hold unit generating a sampling voltage by sampling the sense voltage for a predetermined sampling cycle unit and holding the sampling voltage and a comparator generating the short-circuit sense signal according to a result of comparison between the sampling voltage and a predetermined reference voltage.

The short-circuit sense circuit counts the start-up period and generates an enable-level start-up signal after termination of the start-up period.

The short-circuit sense circuit generates a gate shut-down signal using the start-up signal and the short-circuit sense signal.

The short-circuit sense circuit includes an inverter to which the start-up signal is input and a logic gate generating the gate shut-down signal by performing a logic operation on an output of the inverter and the short-circuit sense signal.

The power supply further includes a switch control circuit generating a gate voltage that turns off the power switch according to the gate shut-down signal.

The power supply further includes a switch control circuit that turns off the power switch when a switch current flowing to the power switch reaches a predetermined level during the start-up period.

The switch control circuit turns off the power switch when a current sense voltage that depends on the switch current reaches to a predetermined level voltage that corresponds to the predetermined level during a turn-on period of the power switch.

Alternatively, the power supply further includes a switch control circuit detecting a peak of the input voltage, setting an on-time that is inversely proportional to the detected peak, and controlling a switching operation of the power switch according to the on-time.

After termination of the start-up period, the output voltage is increased to a predetermined voltage so that the sense voltage is higher than the reference voltage.

According to the exemplary embodiments of the present invention, a short-circuit sense circuit that can sense a short-circuit in an output terminal, a sort-circuit sensing method, and a power supply including the short-circuit sense circuit can be provided

DETAILED DESCRIPTION OF THE EMBODIMENTS

Figure 1:
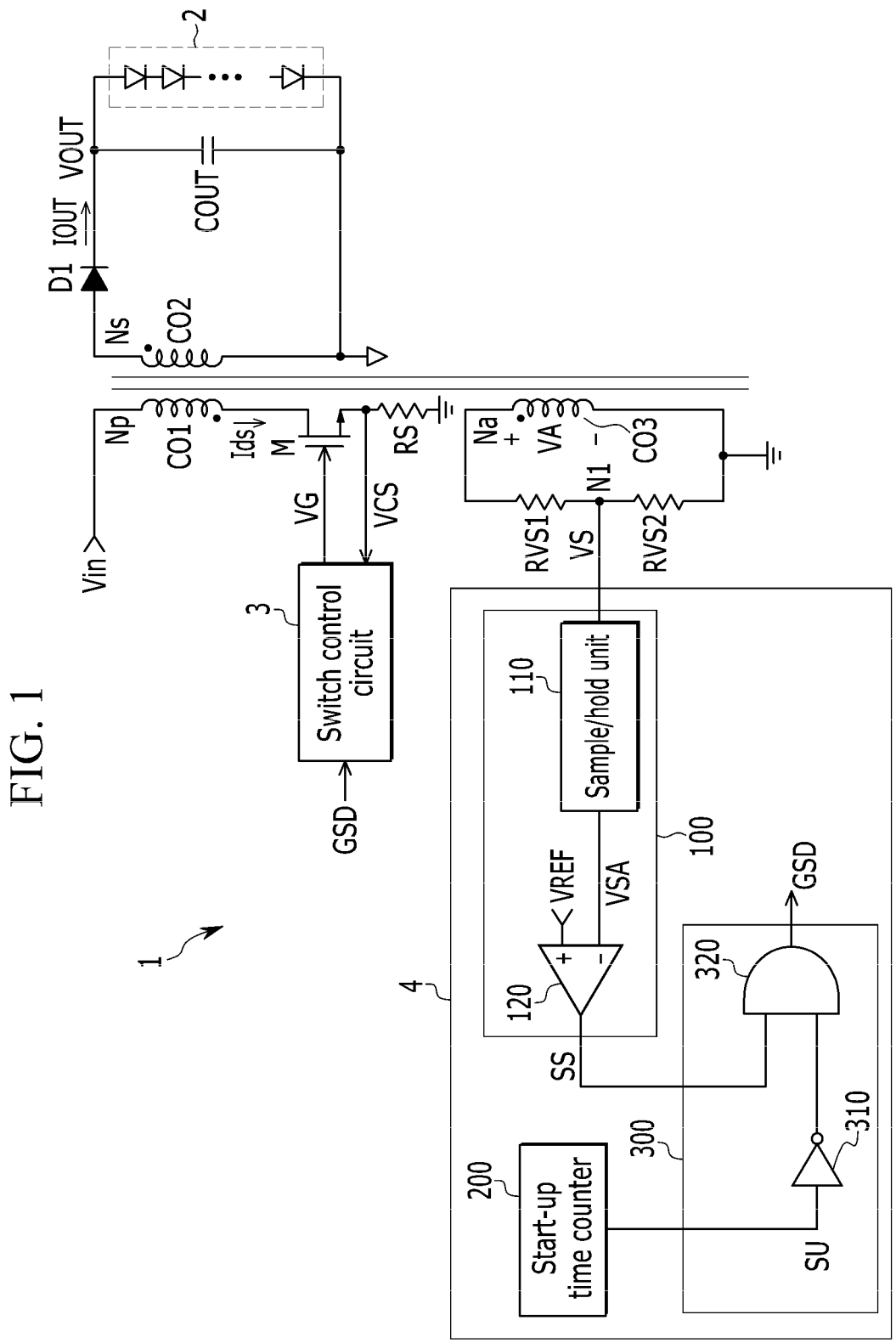
FIG. 1 shows a power supply to which a short-circuit sense circuit is applied according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a short-circuit sense circuit and a power supply including the shot-circuit sense circuit according to an exemplary embodiment of the present invention will be described with reference to FIG. 1.

FIG. 1 shows a power supply to which a short-circuit sense circuit is applied according to an exemplary embodiment of the present invention.

A power supply 1 supplies power to a load using an input voltage Vin. The power supply 1 according to the exemplary embodiment of the present invention is realized as a flyback converter, but the present invention is not limited thereto. As an example of the load coupled to the power supply 1, an LED string 2 is illustrated. The LED string 2 includes a plurality of LED elements coupled in series.

The power supply 1 supplies power to the LED string 2 using the input voltage Vin. An output voltage VOUT is supplied to the LED string 2, and an output current IOUT passed through a rectification diode D1 is supplied to the LED string 2 and an output capacitor COUT. The output capacitor COUT is charged by the output current IOUT, and the output voltage VOUT is maintained by the output capacitor COUT.

A switch control circuit 3 generates a gate voltage VG that controls a switching operation of a power switch M according to a current sense voltage VCS. The current sense voltage VCS is a voltage that depends on a current (hereinafter, referred to as a switch current) Ids flowing to the power switch M.

A resistor RS is coupled between a source of the power switch M and a ground, and a voltage generated in the resistor RS by the switch current Ids flowing through a turn-on period of the power switch M is the current sense voltage VCS. The switch control circuit 3 controls the switching operation of the power switch M with a current mode method or a voltage mode method during a start-up period.

In addition, the switch control circuit 3 receives a gate shut-down signal GDS and triggers a short-circuit protection operation. For example, when an enable-level gate shut-down signal GSD is input, the switch control circuit 3 generates a gate voltage VG that turns off the power switch M.

A first coil CO1 disposed in the primary side is coupled to the input voltage Vin. The power switch M is coupled between the first coil CO1 and the ground. A turn ratio (Na/Np) between turns Na of an auxiliary coil CO3 and turns Np of the first coil CO1 is called wn1. The auxiliary coil CO3 and the first coil CO1 are coupled with the turn ratio wn1.

A second coil CO2 disposed in the secondary side is coupled to an output capacitor COUT through a rectification diode D1, and a turn ratio (Na/Ns) between turns Ns of the second coil CO2 and turns Ns of the auxiliary coil CO3 is called wn2. The auxiliary coil CO3 and the second coil CO2 are coupled with the turn ratio wn2.

The input voltage Vin is supplied to a first terminal of the first coil CO1, and a second terminal of the first coil CO1 is coupled to a drain of the power switch. During a turn-on period of the power switch M1, a current flowing to the first coil CO1 is increased with a slope that depends on the input voltage. During the turn-on period of the power switch M, energy is stored in the first coil CO1. When the power switch M is turned off, the rectification diode D1 is conducted so that a current flows to a secondary side coil CO2.

The output capacitor COUT is charged by a current passed through the rectification diode D1 such that the output voltage VOUT is generated.

When the power switch M1 is turned on, a voltage of the first coil CO1 becomes a negative input voltage Vin, and a negative voltage (−wn1*Vin) obtained by multiplying the turn ratio wn1 to the input voltage Vin is generated as a voltage VA (hereinafter, referred to as an auxiliary voltage) of the auxiliary coil CO3.

When the power switch M is turned off, a voltage of the second coil CO2 becomes the output voltage VOUT. An auxiliary voltage VA becomes a positive voltage (wn2*VOUT) obtained by multiplying the voltage of the second coil CO2 to the turn ratio wn2.

A voltage (hereinafter, referred to a sense voltage) of a node N1 is a voltage divided from the auxiliary voltage VA by a first sense resistor RVS1 and a second sense resistor RVS2. When the LED string 2 is short-circuited, the output voltage VOUT becomes zero voltage, and therefore the auxiliary voltage VA is zero voltage during the turn-off period of the power switch M. Therefore, the sense voltage VS also becomes zero voltage.

A short-circuit sense circuit 4 an exemplary embodiment of the present invention includes an output voltage sense unit 100, a start-up counter 200, and a gate shut-down unit 300.

It is illustrated in FIG. 1 that the short-circuit sense circuit 4 and the switch control circuit 3 are individual blocks, but they may be realized as a single integrated circuit chip.

The output voltage sense unit 100 receives the sense voltage VS that corresponds to the auxiliary voltage VA, and outputs a result of comparison between a voltage generated by sampling the sense voltage VS for every switching cycle and a predetermined reference voltage.

The output voltage sense unit 100 includes a sample/hold unit 110 and a comparator 120.

The sample/hold unit 110 generates a sampling voltage VSA by sampling the sense voltage VS for a switching cycle unit of the power switch M, and holds the sampling voltage VSA. For example, the sample/hold unit 110 generates the sampling voltage VSA for the turn-off period of the power switch M and holds the sampling voltage VSA until before the next turn-off period of the power switch M.

The comparator 120 generates a short-circuit sense signal SS according to a result of comparison between the sampling voltage VSA and a reference voltage VREF. For example, the comparator 120 includes an inverse terminal (−) to which the sampling voltage VSA is input and a non-inverse terminal (+) to which the reference voltage VREF is input, and generates a high-level short-circuit sense signal SS when the input of the non-inverse terminal (+) is higher than the input of the inverse terminal (−) and generates a low-level short-circuit sense signal SS in the opposite case.

A start-up counter 200 counts a start-up period. The start-up period may be defined as a period during which the output voltage VOUT of the power supply 1 reaches to a predetermined level from an operation time point of the power supply 1. After finishing counting of the start-up period, the start-up counter 200 generates an enable-level start-up signal SU that commands termination of the start-up period. For example, the enable level is low level, and the start-up signal SU may be high level during the start-up period of the power supply 1 and may be low level when the start-up period is terminated.

The gate shut-down unit 300 generates a gate shut-down signal GSD that triggers the short-circuit protection operation according to the short-circuit sense signal SS after termination of the start-up period. The gate shut-down unit 300 includes an inverter 310 and an AND gate 320.

The inverter 310 inverts the start-up signal SU and outputs the inverted signal. Since the output voltage VOUT starts to increase from zero voltage in the start-up period, a period during which the auxiliary voltage VA is close to zero voltage is generated in the turn-off period of the power switch M during the start-up period. The short-circuit protection operation may be triggered by a low auxiliary voltage VA even through not in the short-circuit state during the start-up period, and therefore the unexpected triggering of the short-circuit protection operation should be prevented.

In order to prevent the unexpected triggering of the short-circuit protection operation due to the short-circuit sense signal SS during the start-up period, the AND gate 320 performs an AND operation on an inverse level of the start-up signal SU and the short-circuit sense signal SS.

The AND gate 320 generates a gate shut-down signal GDS by performing an AND operation on an inverse level of the start-up signal SU and the short-circuit sense signal SS. The AND gate 320 generates an enable-level (i.e. high level) gate shut-down signal GSD that triggers the short-circuit protection operation when the two inputs are high level.

Hereinafter, a method for the switch control circuit 2 to control a switching operation of the power switch M during the start-up period in a current mode according to the exemplary embodiment of the present invention will be described.

For example, the switch control circuit 3 controls the switching operation of the power switch M according to the current sense voltage VCS during the start-up period. In further detail, the switch control circuit 3 generates a gate voltage VG that turns off the power switch M when the current sense voltage VCS increasing during the turn-on period of the power switch M reaches a predetermined level.

Figure 2:
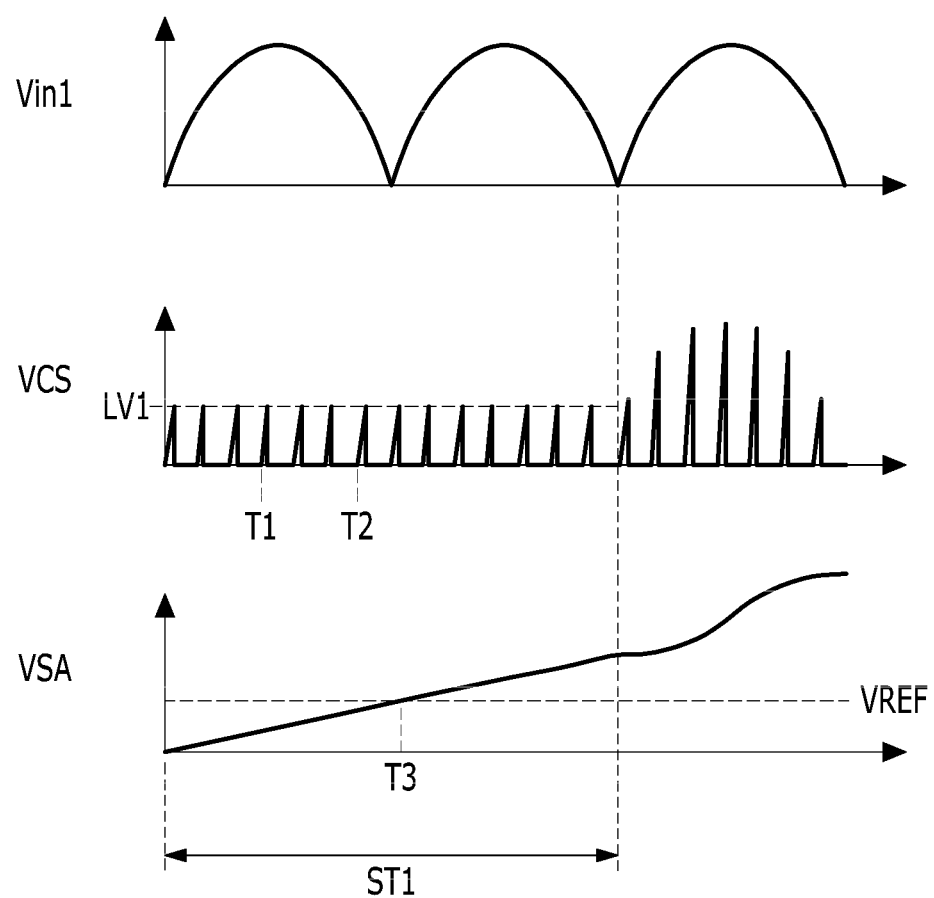
FIG. 2 is a waveform diagram of an input voltage and a current sense voltage according to the exemplary embodiment of the present invention.

FIG. 2 is a waveform diagram of the input voltage, the current sense voltage, and the sampling voltage.

Figure 3:
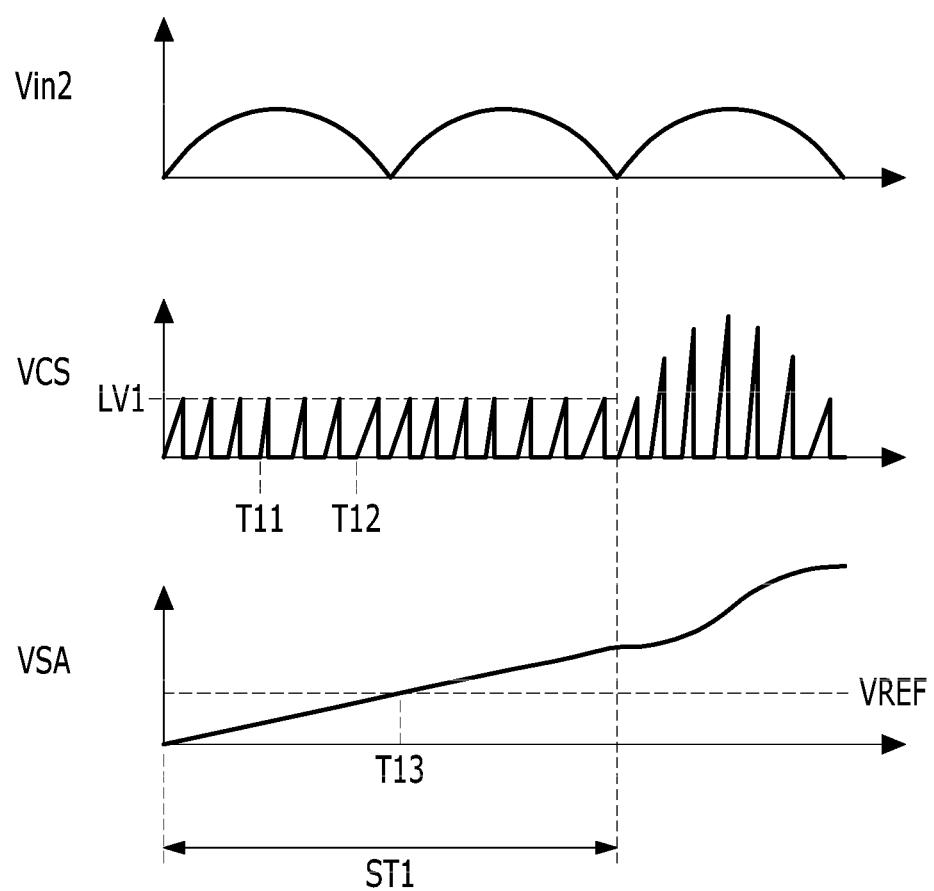
FIG. 3 is a waveform diagram of an input voltage that is different from the input voltage of FIG. 2, and a current sense voltage according to the different input voltage.

FIG. 3 is a waveform of an input voltage that is different from the input voltage of FIG. 2, a current sense voltage, and a sampling voltage according to the different input voltage.

As shown in FIG. 2, the peak of the current sense voltage VCS is controlled to a predetermined level LV1 during a start-up period ST1. In FIG. 3, an input voltage Vin has a peak that is lower than the peak of an input voltage Vin1 shown in FIG. 2, the peak of the current sense voltage VCS is controlled to the predetermined level LV1 during the start-up period ST1.

In FIG. 2 and FIG. 3, a period during which the current sense voltage VCS is increased as a turn-on period of the power switch M, and an rising slope of the drain current Ids depends on the input voltage Vin. Therefore, the current sense voltage VCS has a waveform that increases with a slope that depends on the input voltages Vin1 and Vin2.

For example, the rising slope of the current sense voltage VCS is increased as being close to the peaks of the input voltages Vin1 and Vin2. In further detail, a rising slope of the current sense voltage VCS generated at a time T1 is steeper than a rising slope of the current sense voltage VCS generated at a time T2 in FIG. 2, and a rising slope of the current sense voltage VCS generated at a time T11 is steeper than a rising slope of the current sense voltage VCS generated at a time T12 in FIG. 3.

According to such a switching control operation, a constant energy (without regard to an input voltage) is transmitted as an output during the start-up period. Then, the output voltage VOUT reaches a predetermined voltage within the start-up period.

A sense voltage VS that depends on the output voltage VOUT reached the predetermined voltage becomes higher than the reference voltage VREF. As shown in FIG. 2 and FIG. 3, when a short-circuit does not occurs, that is, in a normal operation, the sampling voltage VSA is gradually increased according to the increase of the output voltage VOUT, and reaches the reference voltage VREF at a time T3 and a time T13, which are included the start-up period ST1.

During the normal operation state, the power supply 1 is normally triggered after termination of the start-up period. For example, as shown in FIG. 2 and FIG. 3, after termination of the start-up period ST1, the peak of the drain current Ids is controlled to follow the waveforms of the input voltages Vin1 and Vin2, and the peak of the current sense voltage VCS also follows the waveforms of the input voltages Vin1 and Vin2.

However, the switch control circuit 3 according to the present exemplary embodiment can control the switching operation of the power switch M according to a power mode method during the start-up period.

For example, the switch control circuit 3 can detect a peak voltage of the input voltage Vin during the start-up period and generate a gate voltage VG by setting an on-time Ton that is inversely proportional to the detected peak voltage.

Figure 4:
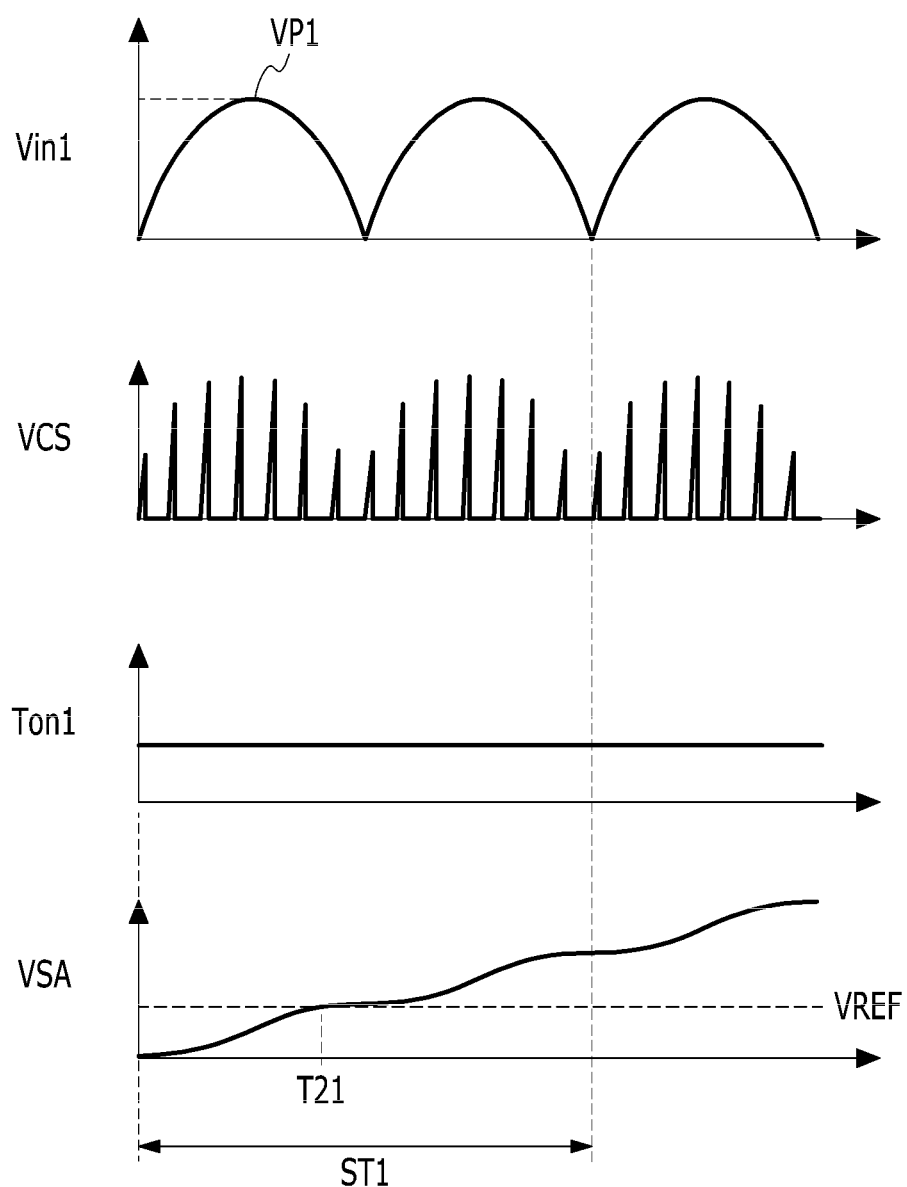
FIG. 4 is a waveform diagram of an input voltage, a current sense voltage, and an on-time according to the exemplary embodiment of the present invention.

FIG. 4 is a waveform of the input voltage, the current sense voltage, and the on-time according to the exemplary embodiment of the present invention.

Figure 5:
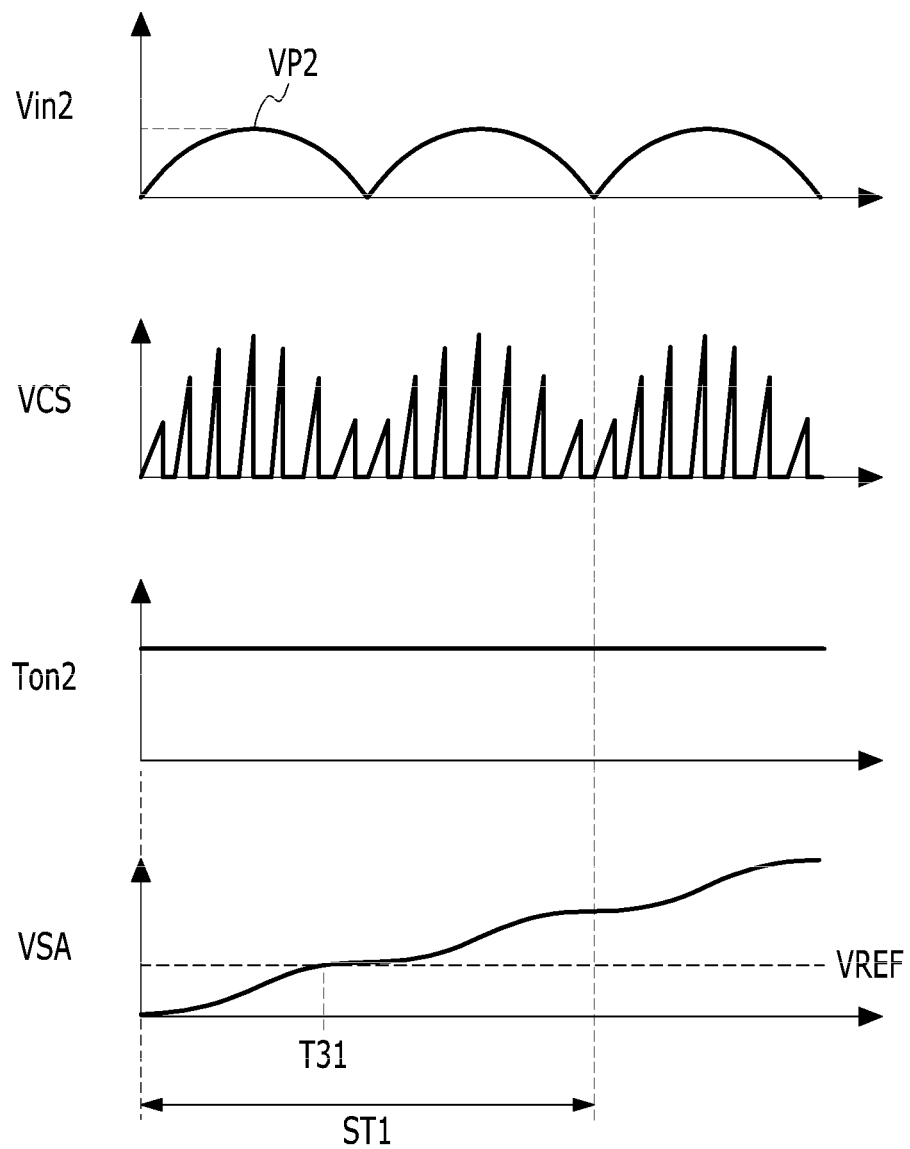
FIG. 5 is a waveform of an input voltage different from the input voltage of FIG. 4, an input voltage, a sense voltage, and an on-time according to the different input voltage.

FIG. 5 is a waveform of an input voltage that is different from the input voltage of FIG. 4, a current sense voltage, and an on-time that depend on the different input voltage.

As shown in FIG. 4 and FIG. 5, a peak voltage VP1 of an input voltage Vin1 is higher than a peak voltage VP2 of an input voltage Vin2, and therefore an on-time Ton1 is set to be shorter than an on-time Ton2.

Since the drain current Ids is increased with a slope that depends on the input voltages Vin1 and Vin2 for an on-time of the power switch M during the start-up period ST1, a rising slope of the current sense voltage VCS also depends on the input voltages Vin1 and Vin2. That is, the rising slope of the current sense voltage VCS becomes steeper as close to the peaks of the input voltages Vin1 and Vin2.

As described, when the switch control circuit 3 operates the switching operation of the power switch M, a constant energy (without regard to input voltage) is transmitted during the start-up period. Then, as in the current mode method, the output voltage VOUT is increased to a predetermined voltage within the start-up period. A sense voltage VS that depends on the output voltage VOUT increased to the predetermined voltage becomes higher than the reference voltage VREF.

As shown in FIG. 4 and FIG. 5, when a short-circuit does not occurs, that is, in a normal operation, the sampling voltage VSA is gradually increased according to the increase of the output voltage VOUT, and reaches the reference voltage VREF at a time T21 and a time T31, which are included the start-up period ST1.

During the normal operation state, the power supply 1 is normally triggered after termination of the start-up period. For example, as shown in FIG. 4 and FIG. 5, after termination of the start-up period ST1, the peak of the drain current Ids is controlled to follow the waveforms of the input voltages Vin1 and Vin2, and the peak of the current sense voltage VCS also follows the waveforms of the input voltages Vin1 and Vin2.

Figure 6:
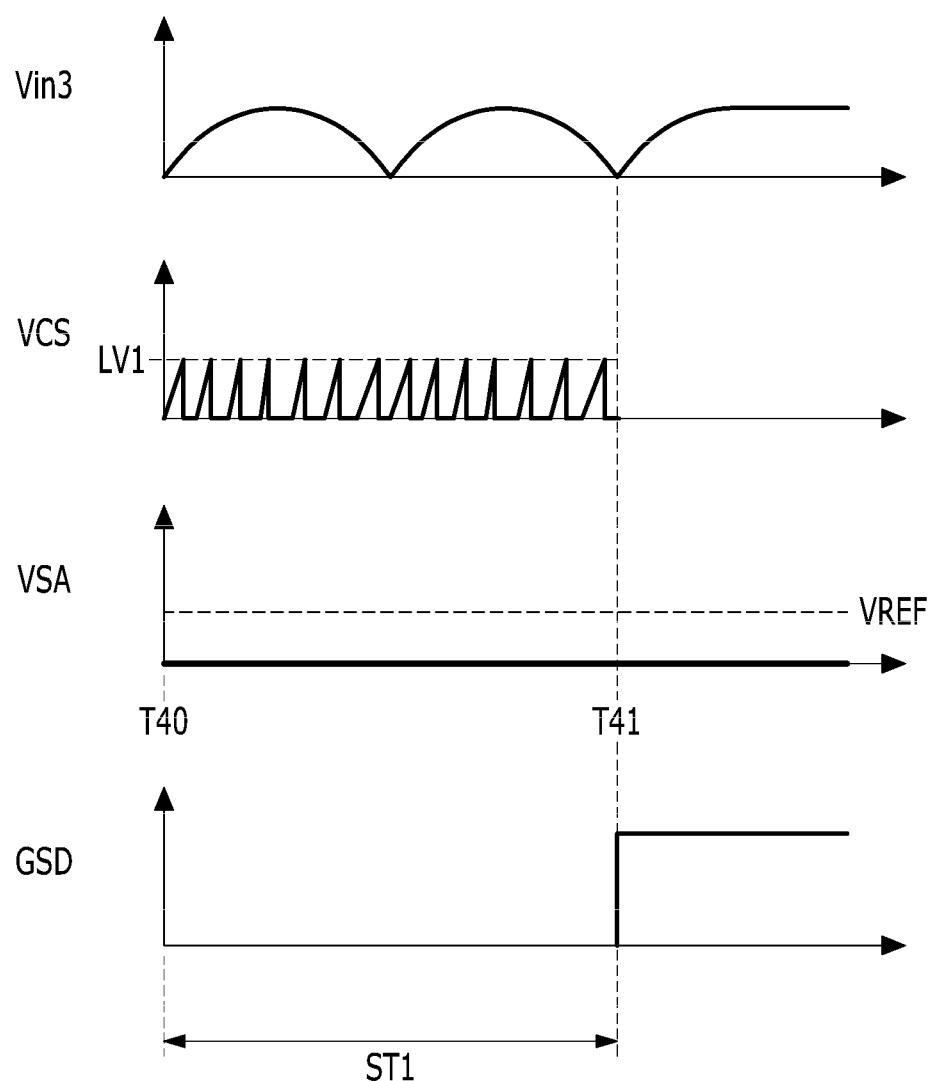
FIG. 6 is a waveform diagram of an input voltage, a sense voltage, a sampling voltage, and a gate shut-down signal when a short-circuit occurs during a start-up period.
Figure 7:
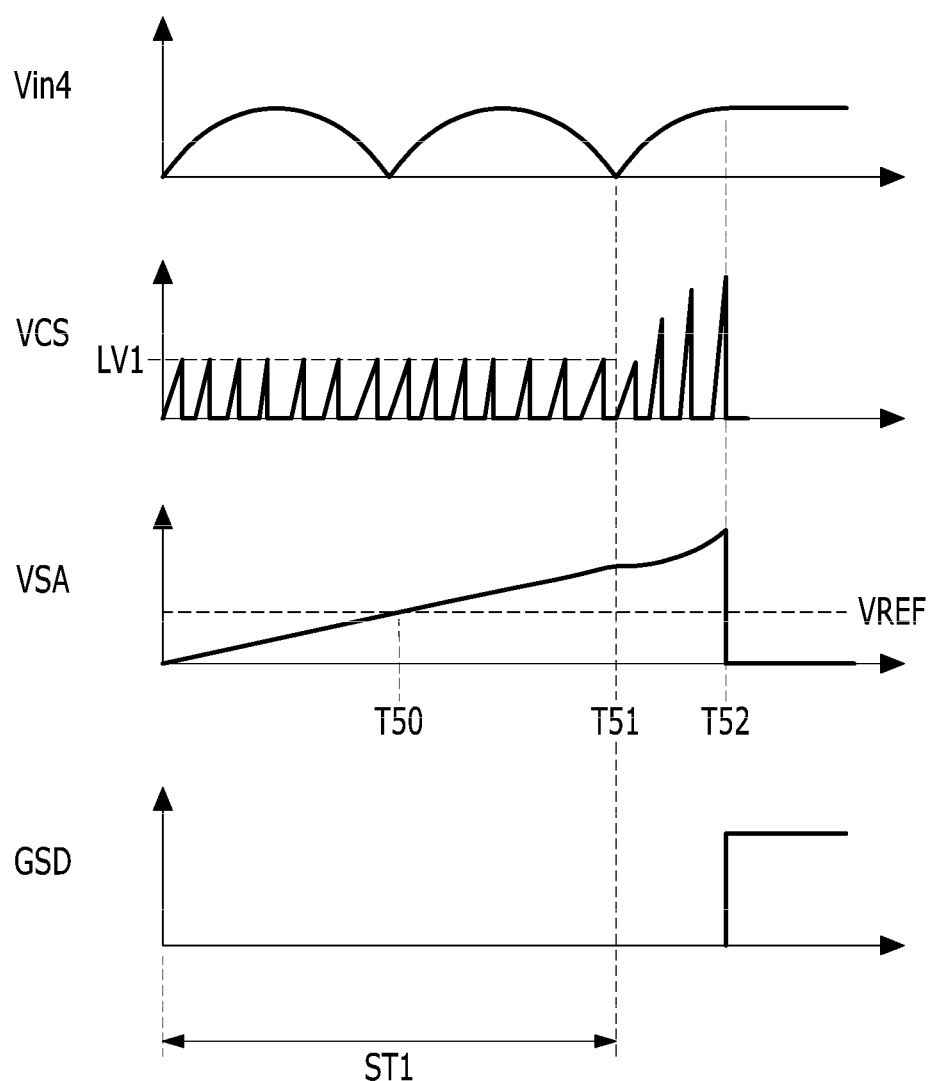
FIG. 7 is a waveform diagram of an input voltage, a sense voltage, a sampling voltage, and a gate shut-down signal when a short-circuit occurs after the start-up period.

Hereinafter, an operation in a case that a short-circuit occurs according to the exemplary embodiment of the present invention will be described with reference to FIG. 6 and FIG. 7. FIG. 6 and FIG. 7 are waveform diagrams illustrating a case that the switching operation of the power switch is operated according to the current mode method during the start-up period.

FIG. 6 is a waveform diagram illustrating an input voltage, a sense voltage, a sampling voltage, and a gate shut-down signal when a short-circuit occurs during the start-up period.

FIG. 7 is a waveform diagram illustrating an input voltage, a sense voltage, a sampling voltage, and a gate shut-down signal when a short-circuit occurs after termination of the start-up period.

For example, a short-circuit occurs at a time T40 as shown in FIG. 6. Then, no output voltage VOU is generated, and thus the sense voltage VS is not generated and the sampling voltage VSA is also not generated. Then, the comparator 120 outputs a high-level short-circuit sense signal SS to the AND gate 320 from the time T40.

During the start-up period ST1, the peak of the drain current Ids flowing to the power switch M is controlled to a constant level. That is, when the peak of the current sense voltage VCS reaches a predetermined level LV1, the power switch M is turned on.

The start-up signal SU is decreased to low level at a time T41 at which the start-up period ST1 is terminated, a start-up signal US inverted to high level is input to the AND gate 320. Since all inputs of the AND gate 320 are high level at the time T41, the AND gate 320 increases the gate shut-down signal GSD to high level.

In the exemplary embodiment of the present invention, the high level is set to an enable level (i.e., a level that stops switching operation by sensing short-circuit) of the gate shut-down signal GSD, and accordingly, an AND gate is used. However, the exemplary embodiment of the present invention is not limited thereto.

The switch control circuit 3 generates a low-level gate voltage VG that turns off the power switch M according to the high-level gate shut-down signal GDS.

For example, as shown in FIG. 7, a short-circuit occurs at a time T52 after the start-up period ST1.

When the peak of the current sense voltage VCS reaches to the predetermined level LV1 during the start-up period ST1, the power switch M is turned off. During the start-up period ST1, the output voltage VOUT is increased according to the switching operation of the power switch M and the sampling voltage VSA is also increased. At a time T50, the sampling voltage VSA reaches the reference voltage VREF.

After a time T51 at which the start-up period ST1 is terminated, the current sense voltage VCS is controlled with a waveform that depends on an input voltage Vin4.

When a short-circuit occurs at the time, no output voltage VOUT is generated and therefore the sampling voltage VSA is also not generated. Thus, an output of the comparator 120 is increased to high level at the time T52, and all inputs of the AND gate 320 are high level, and therefore the AND gate 320 increases the gate shut-down signal GSD to high level.

The switch control circuit 3 generates a low-level gate voltage VG that turns off the power switch M according to the high-level gate shut-down signal GSD.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power supply 1, LED string 2, switch control circuit 3
short-circuit sense circuit 4, first coil CO1, second coil CO2 auxiliary coil CO3, power switch M
rectification diode D1, output capacitor COUT
output voltage sense unit 100, counter 200, gate shut-down unit 300
sample/hold unit 110, comparator 120
inverter 310, AND gate 320, first sense resistor RVS1
second sense resistor RVS2

What is claimed is:

1. A short-circuit sense circuit configured to sense a short-circuit in a load coupled to a power supply, the short-circuit sense circuit comprising:
   an output voltage sensing unit configured to sample a sense voltage depending on an output voltage of the power supply and to generate a short-circuit sense signal based on a result of comparison between the sampled voltage and a predetermined reference voltage;
   a start-up counter configured to count a start-up period from an operation start time of the power supply; and
   a gate shut-down unit configured to generate a gate shut-down signal based on the short-circuit sense signal after termination of the start-up period based on an output of the start-up counter;
   wherein a peak of a current sense voltage based on a current flowing to a power switch is controlled to a predetermined level during the start-up period.

2. The short-circuit sense circuit of claim 1, wherein the sense voltage comprises a voltage divided from an auxiliary voltage by a first sense resistor and a second sense resistor, the auxiliary voltage being provided by an auxiliary coil coupled to a secondary side coil with a predetermined turn ratio, the second side coil being coupled to the output voltage.

3. The short-circuit sense circuit of claim 2, wherein the output voltage sense unit comprises:
   a sample/hold unit configured to generate a sampling voltage by sampling the sense voltage for a predetermined sampling cycle unit and holding the sampling voltage; and
   a comparator configured to generate the short-circuit sense signal based on a result of a comparison between the sampling voltage and a predetermined reference voltage.

4. The short-circuit sense circuit of claim 3, wherein the start-up counter is configured to generate an enable-level start-up signal at a time after the start-up period is passed.

5. The short-circuit sense circuit of claim 4, wherein the gate shut-down unit is configured to generate the gate shut-down signal based on the start-up signal and the short-circuit sense signal.

6. The short-circuit sense circuit of claim 5, wherein the gate shut-down unit comprises:
   an inverter configured to receive the start-up signal; and
   a logic gate configured to generate the gate shut-down signal by performing a logic operation on an output of the inverter and the short-circuit sense signal.

7. A short-circuit sensing method for sensing a short-circuit in a load coupled to a power supply, the method comprising:
   generating a sampling voltage by sampling a sense voltage depending on an output voltage of the power supply;
   generating a short-circuit sense signal based on a result of comparison between the sampling voltage and a predetermined reference voltage; and
   generating a gate shut-down signal based on the short-circuit sense signal after termination of a start-up period from an operation start time of the power supply,
   wherein a switching operation of the power supply is stopped based on an enable-level gate shut-down signal, and a peak of a current sense voltage based on a current flowing to a power switch is controlled to a predetermined level during the start-up period.

8. The short-circuit sensing method of claim 7, wherein the sense voltage comprises a voltage divided from an auxiliary voltage by a first sense resistor and a second sense resistor, the auxiliary voltage being provided by an auxiliary coiled coupled to a secondary side coil with a predetermined turn ratio, the second side coil being coupled to the output voltage.

9. The short-circuit sensing method of claim 8, wherein generating the sampling voltage comprises generating a sampling voltage by sampling the sense voltage for a predetermined sampling cycle unit and holding the sampling voltage.

10. A power supply comprising:
    a primary side coil having a first terminal coupled to an input voltage;
    a power switch coupled to a second terminal of the primary side coil;
    a secondary side coil coupled to an output voltage;
    an auxiliary coil coupled to the secondary side coil with a predetermined turn ratio;
    a first sense resistor and a second sense resistor coupled in series to lateral terminals of the auxiliary coil; and
    a short-circuit sense circuit configured to determine whether a short-circuit occurs using a short-circuit sense signal after termination of a start-up period from an operation start time of the power supply, the short-circuit sense signal being based on a result of a comparison between a sampling voltage and a predetermined reference voltage, the sampled voltage being generated by sampling a sense voltage, the sense voltage comprising a voltage of a node between the first sense resistor and the second sense resistor;
    wherein a peak of a current sense voltage based on a current flowing to a power switch is controlled to a predetermined level during the start-up period.

11. The power supply of claim 10, wherein the short-circuit sense circuit comprises:
    a sample/hold unit configured to generate the a sampling voltage by sampling the sense voltage for a predetermined sampling cycle unit and holding the sampling voltage; and
    a comparator configured to generate the short-circuit sense signal based on a result of comparison between the sampling voltage and a predetermined reference voltage.

12. The power supply of claim 10, wherein the short-circuit sense circuit is configured to generate a gate shut-down signal based on the start-up signal and the short-circuit sense signal.

13. The power supply of claim 12, wherein the short-circuit sense circuit comprises:
    an inverter to which the start-up signal is input; and
    a logic gate configured to generate the gate shut-down signal by performing a logic operation on an output of the inverter and the short-circuit sense signal.

14. The power supply of claim 12, further comprising a switch control circuit configured to generate a gate voltage configured to turn off the power switch based on the gate shut-down signal.

15. The power supply of claim 10, further comprising a switch control circuit configured to turn off the power switch when a switch current flowing to the power switch reaches a predetermined level during the start-up period.

16. The power supply of claim 15, wherein, after termination of the start-up period, the output voltage is increased to a predetermined voltage so that the sense voltage is higher than the reference voltage.

17. The power supply of claim 15, wherein the switch control circuit is configured to turn off the power switch when a current sense voltage depending on the switch current reaches to a predetermined level voltage corresponding to the predetermined level during a turn-on period of the power switch.

18. The power supply of claim 10, further comprising a switch control circuit configured to detect a peak of the input voltage, set an on-time that is inversely proportional to the detected peak, and control a switching operation of the power switch based on the on-time.

19. The power supply of claim 18, wherein, after termination of the start-up period, the output voltage is increased to a predetermined voltage so that the sense voltage is higher than the reference voltage.

* * * * *

UNITED STATES PATENT AND TRADEMARK OFFICE
CERTIFICATE OF CORRECTION

| | | |
|---|---|---|
| PATENT NO. | : 9,184,653 B2 | Page 1 of 1 |
| APPLICATION NO. | : 13/921474 | |
| DATED | : November 10, 2015 | |
| INVENTOR(S) | : Hyun-Chul Eom et al. | |

It is certified that error appears in the above-identified patent and that said Letters Patent is hereby corrected as shown below:

Claims

In column 10, line 38, in Claim 11, delete "the a" and insert -- the --, therefore.

Signed and Sealed this
Twenty-second Day of March, 2016

Michelle K. Lee
*Director of the United States Patent and Trademark Office*